United States Patent Office 3,535,462
Patented Oct. 20, 1970

3,535,462

SYSTEM AND PROCESS FOR SUPERVISING SIGNAL LINES

Dieter Voegtlen, Starnberg, and Fritz Brandt and Karl Bruninghaus, Munich, Germany, assignors to Siemens Aktiengesellschaft, Berlin and Munich, Germany Filed Mar. 30, 1967, Ser. No. 627,096
Claims priority, application Germany, Mar. 31, 1966, S 102,966
Int. Cl. H04q *3/42*
U.S. Cl. 179—18 16 Claims

ABSTRACT OF THE DISCLOSURE

A supervisory control system and process, wherein supervisory and evaluation circuits are employed to determine the states of a plurality of signal lines. Depending upon connections effected in a signal line, specific signals are present therein, and these signals are evaluated to determine the state of the signal line. Inquiry elements are operatively associated with the signal lines and are selectively connected to the supervisory and evaluation circuits to provide a scanning process for successive evaluation of the signal lines. Ferromagnetic or ferroelectric inquiry elements may be utilized, which are connectable to the signal lines and are responsive to the signal therein, to provide supervisory output signals that are evaluated to determine the state of the associated signal line.

A plurality of comparison elements are utilized to compensate for the various factors that may effect erroneous indications of the state of the signal being questioned.

CROSS REFERENCE TO RELATED APPLICATION

Priority is claimed from German application Ser. No. S 102,966 filed Mar. 31, 1966. The invention disclosed herein is a modification of the invention described in the copending U.S. application Ser. No. 627,147 that claims priority from German application Ser. No. 102,965, assigned to the same assignee as this application.

BACKGROUND OF THE INVENTION

Field of the invention

The invention relates to supervisory questioning of signal lines, to determine the existing state of the line. Thus, depending upon which one of a plurality of possible connections is completed in the signal line being questioned, a specific current will flow in the signal line. An inquiry element is associated with each signal line, and depending upon how the inquiry element is effected by the signals present therein, the supervisory and evaluation apparatus can determine the particular state of the signal line. The invention has particular use in telephone installations wherein a plurality of lines must be constantly checked to determine the state thereof.

A plurality of comparison elements are periodically checked to compensate for factors that may contribute to erroneous indications by the inquiry elements. These are ageing of the inquiry element, and variations in the operating temperature and potential, for example.

Description of the prior art

The prior art discloses the utilization of ferromagnetic or ferroelectric elements connected to long distance communication lines, that are actuatable between bistable states, depending upon whether the line being tested is open or closed. The ferromagnetic or ferroelectric inquiry elements comprise input means periodically fed with scanning pulses. Depending upon the state of the communication line, the associated inquiry element assumes one of the bistable states. A change between bistable states causes the ferromagnetic or ferroelectric means to generate supervisory control pulses in associated output means, that may be evaluated to determine the condition or state of the line being tested. If the state of the line being tested changes rapidly, the scanning process can be repeated at a rate sufficient to ensure correct indication of the state of the communication line.

Therefore, it is seen that a determination can be made as to whether the long distant communication line is free or busy, depending upon whether or not a current is flowing therein. Further, these types of inquiry elements may also be utilized to provide an indication of the particular signal pulses being transmitted over a signal line. However, this requires that the signal line be scanned at least once during the duration of the shortest signal pulse, or the shortest time interval between two successive signal pulses. To preclude multiple counting of an individual signal pulse, the actual registration criteria is ascertained according to the "last-look principle." According to this principle, each inquiry result is registered intermediately for the duration of an individual inquiry cycle in a register, and is then compared to the successive inquiry result. Since the transition from the signal-absent state to the signal-present state, as well as the transition from the signal-present state to the signal-absent state is characteristic for each signal pulse, the registration of a signal pulse may be effected only when such a transition is evaluated.

However, the inquiry element is thereby limited in its recognition capability, since it recognizes only the existence or non-existence of a signal pulse at a certain time. It cannot differentiate between the existence of a plurality of possible signals, any one of which may be transmitted by the signal line at a particular time.

Further, the prior art does not teach the utilization of compensating means to compensate for changes in the inquiry elements, or in the signals applied thereto, to effect accurate indication of the state of the signal line being questioned. Thus, various factors such as age, temperature and operating potential variations, may cause inaccurate readings if compensation is not provided.

SUMMARY OF THE INVENTION

These and other objections and defects of the prior art are solved by the present invention. A plurality of inquiry elements, which comprise either ferromagnetic or ferroelectric elements, are interconnected in a matrix. Each individual inquiry element is associated with a particular communication line, and its magnetic or electric state (depending upon whether it is a ferromagnetic or a ferroelectric element, respectively) is initially determined by the signals flowing in the communication line. Inquiry signals are fed to the inquiry element, and the changes in state effected in the inquiry element thereby develop supervisory signals indicative of the signals flowing in the communication line.

The inquiry signals may comprise a stepped wave or a sawtooth wave signal. Depending upon the initial state of the inquiry element which is determined by the condition of the communication line, the inquiry element will respond to the inquiry signals in a particular manner. For example, if ferromagnetic inquiry elements are utilized, its input winding is connected in the communication line. The inquiry pulses are then fed to a control winding of the inquiry element, and the supervisory signals are induced in an output winding of the inquiry element in response thereto, which are indicative of the signals flowing in the communication line.

The communication line may be in one of several states. For example, it may comprise parallel circuits, each having an individual series connected switch. Depending upon whether both switches are open, or a selected one of the switches is closed, the communication line will have certain currents flowing therein, which are fed to the input winding of the inquiry element. This will cause the inquiry element to assume a particular magnetization state, and changes in the magnetization state effected by the inquiry signals are then evaluated to indicate the state of the communication line, and particularly which, if any, switch is closed. The utilization of a stepped or sawtooth wave inquiry signal, and its connection to the inquiry element being questioned such as to develop a net magnetic field of zero intensity in response thereto, serves to provide a convenient standard reference to provide a relatively fast evaluation of the state of the communication line associated therewith.

When the state of the particular communication line being tested has been evaluated and indicated, the control apparatus successively connects the supervisory and evaluation circuits to another inquiry element. Thus, a plurality of inquiry elements are successively questioned in a relatively short period of time, and may be continuously supervised.

The inquiry element associated with the signal line being supervised, is selected by address signals. The steps of selecting the inquiry element, and then questioning it, are time separated, to preclude distoritions that may be introduced during the selection process from affecting the indications produced by the inquiry elements and to eliminate the necessity of synchronously applying inquiry signals to provide both selection and questioning signals to the selected inquiry element. Further, by providing individual address signals, the selection process may be stopped during supervision of the selected inquiry element.

Further, this invention also teaches the utilization of supplementary preenergization means, which compensates for the various factors that may shift the supervisory inquiry element from its initial predetermined operating ranges corresponding to the three possible signal line states. If such compensation were not provided, erroneous indications of the states of the supervised signal lines might be produced. Factors producing such erroneous indications, are inquiry element ageing, and temperature and operation potential fluctuations, for example. Further, the supplementary preenergization substantially eliminates distortion signals that may be introduced when the communication lines being supervised transmit direct current signals modulated by alternating current signals.

DETAILED DESCRIPTION OF THE INVENTION

Figure 1:
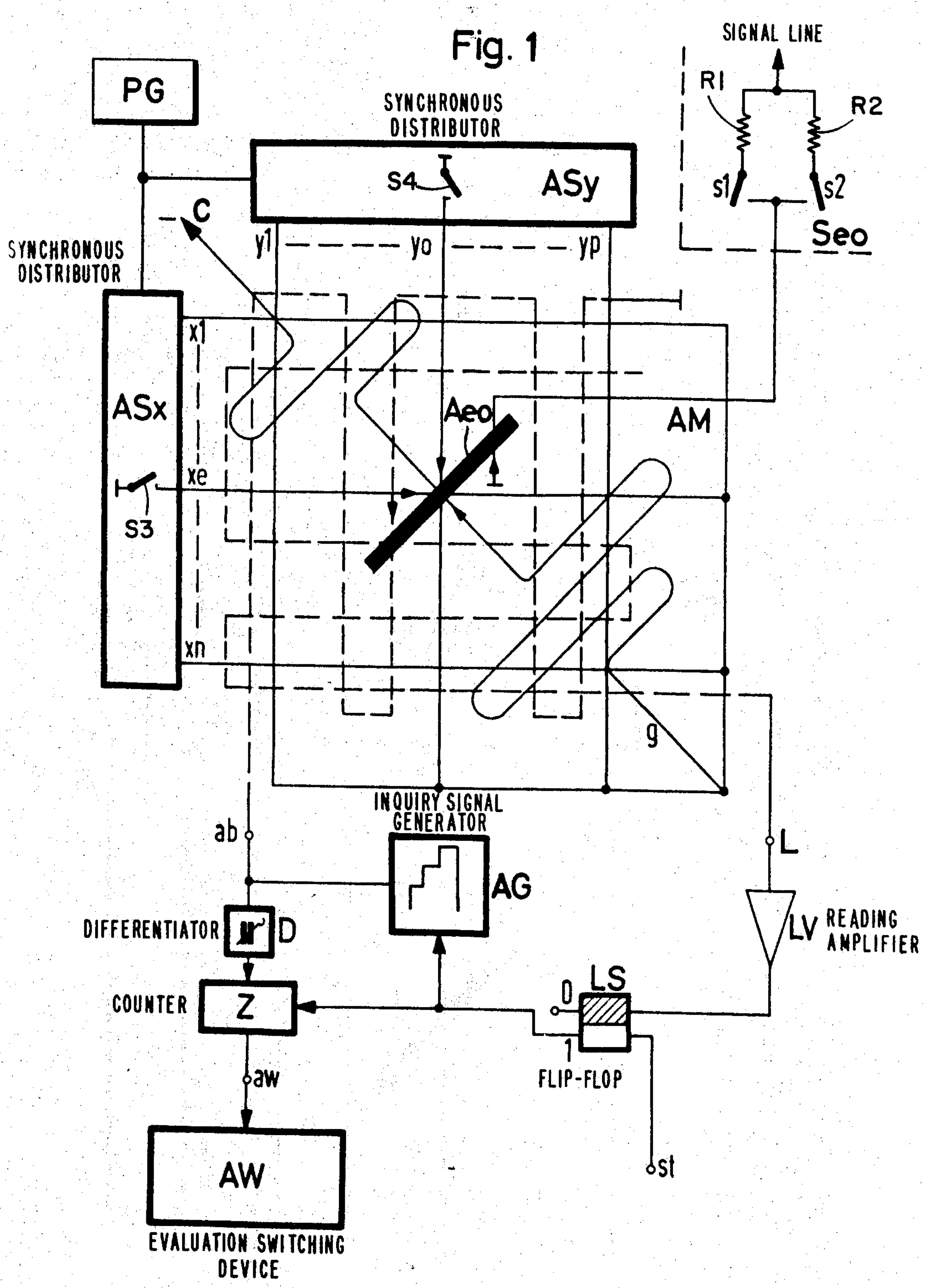
FIG. 1 is an electrical schematic diagram of an embodiment of the invention, which illustrates the matrix comprising the inquiry elements, connected to the supervisory evaluation appartus and the inquiry signal generating apparatus.
Figure 2:
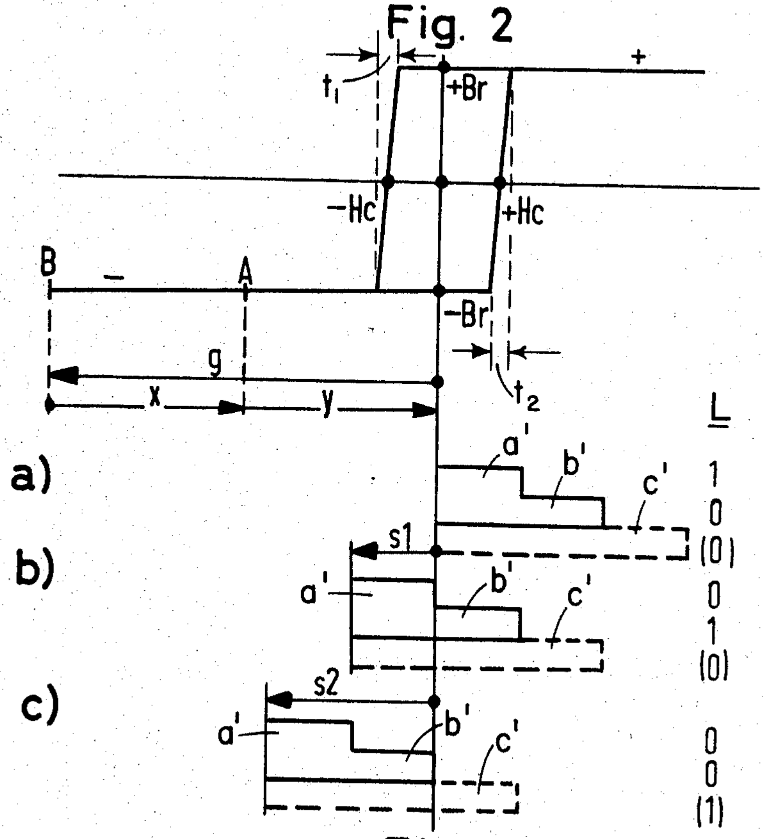
FIG. 2 illustrates a typical hysteresis loop of a ferromagnetic material having an hysteresis loop and magnetic storage energy properties, and the magnetization states effected when a stepped wave signal comprising successively increasing amplitude levels are applied thereto.

FIG. 1 illustrates one embodiment of the invention, wherein the selection of the inquiry element of the signal line to be questioned, and the actual questioning of the inquiry element, occurs in successive steps. The individual inquiry element is selected by synchronous actuation of synchronous distributors ASX and ASY. For example, FIG. 1 illustrates the selection of inquiry element A*eo*, by synchronously closing switches S3 and S4 of ASX and ASY, respectively. This completes the circuits from synchronous distributors ASX and ASY, through connection lines X*e* and Y*o*, respectively, to inquiry element A*eo* through common counter magnetization line G, to terminal —*c*. Therefore, equal and oppositely directed currents flow through the control winding of inquiry element A*eo*, since the currents flowing in lines X*e* and Y*o* flow oppositely to the combined currents flowing in line G. This is illustrated in FIG. 2, wherein it is shown that the magnetic fields X and Y effected by the currents bowing in connection lines X*e* and Y*o*, respectively, are equal and of same polarity (that is, positive) and are oppositely directed to the magnetic field effected by the current flowing in the counter magnetization line G (wherein, G equals —X—Y). It is therefore seen that the combined or total magnetic field developed by inquiry element A*eo* under these conditions, equals zero, due to the inquiry signals fed over lines X*e* and Y*o* to its control winding. Simultaneously, either the current flowing in counter magnetization line G, or the current flowing in column connection line Y*o* or in row connection line X*e*, flows through the control windings of the inquiry elements not being questioned and magnetically polarizes these inquiry elements into the negative saturation range (to either point B or point A). Therefore, the inquiry signal, which is fed to the common control winding of the inquiry elements comprising matrix AM over line *ab*, does not appreciably effect the inquiry elements of the signal lines not being questioned since the magnetic flux variations it produces therein, is practically ineffective since they occur within one of the saturation ranges. Therefore, the correct indication of the state or condition of the selected inquiry element A*eo* being questioned, is obtained.

Thus, it is seen that the circuit illustrated in FIG. 1, provides that at the beginning of the questioning process for the selected inquiry element, the selected inquiry element is in a predetermined magnetic polarized state (—B*r*). Then, assuming that its associated signal line S*eo* is in the state wherein switches S1 and S2 are both open, a binary 1 reading will be obtained when the first evaluation signal segment *a'* with reference to Example (a) of FIG. 2 is fed to inquiry element A*eo* since transition zone *t*2 will be traversed. This will eliminate the necessity ofr proceeding further with the inquiry process, resulting in a substantial savings in time.

The synchronous distributors ASX and ASY comprise switch means S3 and S4 which are selectively and synchronously actuable to complete circuits to the desired inquiry element. For example, closure of switches S3 and S4 as illustrated in FIG. 1, will enable questioning of signal line S*eo* through inquiry element A*eo*. Synchronous distributor ASX is connectable to a plurality of parallel lines output row connection lines, X1, X*e*, X*n*, and synchronous distributor ASY is connectable to a plurality of parallel column connection lines Y1, Y*o*, and Y*p*. The number of row and column connection lines can be varied, depending upon the number of inquiry elements to be questioned.

The arrangement illustrated in FIG. 1, provides a plurality of inquiry elements, successively and individually connected to an associated row and column connection line. Thus, nine inquiry elements are utilized in this arrangement; however, for clarity, only inquiry element A*eo* is illustrated. Further, counter magnetization connection line G is connected in series with the row and column connection lines, and the signals flowing therein are fed back to the inquiry element being questioned in such a manner as to effect an opposing and equal magnetic field compared to the magnetic fields developed by the currents flowing in the row and column connection lines. The common counter magnetization connection line G is connected to all inquiry elements of matrix AM; this is symbolically illustrated in FIG. 1.

As explained heretofore, the address signal XY drives all of the non-selected inquiry elements into magnetic saturation, and simultaneously effects initial magnetization of the inquiry element being questioned to the negative remanent magnetic state, —B*r*. Therefore, the inquiry signals which are then fed over line *ab* through the inquiry elements, and particularly to the inquiry element of the signal line being questioned, are precluded from inducing distortions or incorrect indications in the non-selected inquiry elements, since they are deep in the negative saturation range. Thereby, they do not effect the output reading obtained from the output winding of inquiry element A*eo*, being questioned.

Reading flip-flop L is triggered by control signals fed over line *st*, causing it to emit a control pulse, that simultaneously activates inquiry signal generator AG, and resets counter Z to the zero position. The purpose of counter Z is to count the inquiry signal segments to determine when a binary 1 output is produced by the inquiry element of the signal line being questioned, this being indicative of a magnetic polarization reversal thereof, and hence, of the state of signal line S*eo*. Counter Z is actuated by control pulses derived by differentiator D, which serves to differentiate the front flanks of the inquiry signal segments.

When the magnetic polarization of the inquiry element A*eo* is reversed in response to a segment of the inquiry signal, the maximum flux variation range *t*2 will be crossed, and the common output or read winding L of the inquiry elements will have a relatively large amplitude current pulse induced therein. This will be amplified by amplifier LV, and will reset reading flip-flop stage LS to the rest position, simultaneously deenergizing the inquiry signal generator AG, and counter Z. Counter Z and particularly the number of individual inquiry signals counted, is then evaluated by evaluation switching device AW, to determine the condition of signal line S*eo*.

For example, with reference to FIG. 2, Example *a*, if a binary 1 output (indicative of a large amplitude variation and thus of a magnetization polarization reversal of the inquiry element A*eo*) is read in response to the first inquiry signal segment *a*′, counter Z will count to one, which is indicative of both switches S1 and S2 being opened. If a binary 1 output is produced by the inquiry element in response to the second signal segment, *b*′, counter Z will stop counting at integer 2, which is indicative of switch S1 being closed, Example (b). Finally, if a binary 1 output is produced by inquiry element A*eo* in response to the third control signal segment, C′, counter Z will count to integer 3, and this will be evaluated by evaluator AW as indicative of switch S2 being closed, Example (c). S1 and S2 indicate the currents in the supervised signal line effected by closing the associated switches S1 and S2.

Figure 3:
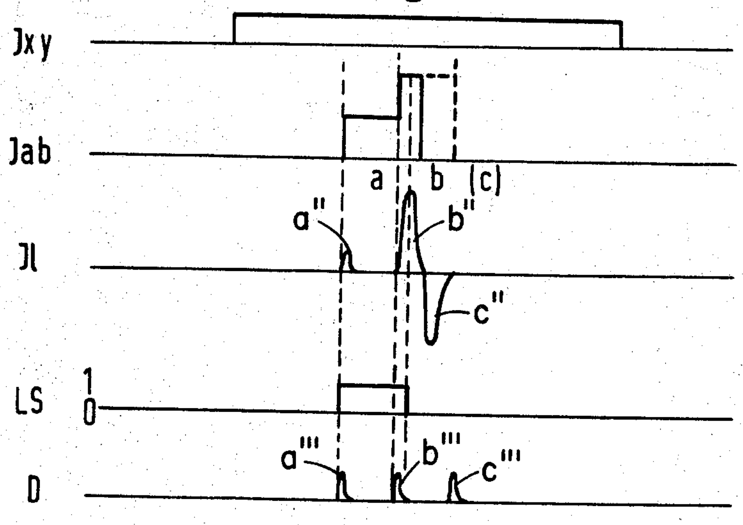
FIG. 3 is a series of five related graphs, illustrating the signals present in various parts of the circuit illustrated in FIG. 1 at selected times.

FIG. 3 is illustrative of the operation of the inquiry arrangement illustrated in FIG. 1. Thus, closure of the switches of synchronous distributors ASX and ASY, effects completion of the address circuit, which results in feeding current XY to the selected inquiry element, to set the inquiry element to the remanent magnetic state—B*r*. The inquiry signal AB, comprising successive pulses of increasing amplitude *a*′, *b*′, *c*′, is then fed to the inquiry element, at a predetermined time thereafter to ensure that correct readings are obtained, since there is a time interval loss involved in switching to the selected inquiry element. Thus, the inquiry or questioning process is isolated from this initial reaction time.

Assuming that switch S1 of signal line S*eo* is closed, the front flank of signal segment *a*′ will cause only a slight amplitude current to be induced in the read winding L, because as explained heretofore, the magnetic change or variation produced thereby is effective within the saturation range, thereby causing small currents to be induced in the read winding. However, when signal segment *b*′ is fed to inquiry line *ab*, a magnetic polarization reversal across transition zone *t*2 is effected, causing read amplifier LV to respond thereto, and to produce an output pulse that deactuates reading flip-flop LS. Therefore, counter Z will have read two integers, and this will be evaluated by evaluator AW to indicate that switch S1 is closed.

As heretofore explained, reading flip-flop LS deactivates the inquiry signal generator AG, when amplifier LV produces a binary 1 output. This causes a corresponding and relatively large magnetic flux variation from a positive magnetic field to zero magnetic field, causing a negative pulse to be generated in read winding L. However, the negative distortion pulse C′′′′ induced in the read winding is not effective to produce an inaccurate reading, since it occurs after reading flip-flop LS is reset as a result of signal segment *b*′ effecting a magnetization polarization reversal. Further, it is of opposite polarity to that necessary to reactivate reading flip-flop LS.

Graph D of FIG. 3, illustrates the differentiation of the front flank segments of the inquiry signal, which are fed to counter Z. The dotted lines illustrated in Graphs *ab*, and D illustrate that signal segment *c*′ will be fed to inquiry line *ab* if remagnetization does not occur in response to signal segment *b*′. This, of course, would be indicative of switch S2 being closed. The address signal XY is also illustrated, and it is seen that the inquiry signal *ab* is fed to the control winding at a time spaced interval thereafter. Graph LS indicates activation of reading flip-flop LS in response to signal *st*, to activate inquiry signal generator AG and counter Z. Graph LV shows the relative signals *a*′′ and *b*′′ induced in read winding L in response to signal segments *a*′ and *b*′, respectively.

Thus, signal segment *a*′ causes a relatively small signal *a*′′ to be induced (a binary 0), since the associated magnetic flux variation occurs within the saturation range. However, signal segment *b*′ causes a relatively large signal *b*′′ to be induced (a binary 1) since the associated magnetic flux variations occurs across the transition zone *t*2. This deactivates reading flip-flop LS as heretofore explained, and hence inquiry signal generator AG and counter Z, the latter having counted two pulses (*a*′ and *b*′). This is indicative of switch S1 being opened. Pulse *c*′ is then not generated.

It is therefore seen that the FIG. 1 embodiment of the invention, substantially decreases the effect that any distortion signals generated may have on the associated signal line. These, of course, are effected when the inquiry element is initially energized by the inquiry signal, and is then subsequently deenergized, since relatively large changes in magnetic flux densities then occur. Therefore, it is seen that the two distortion pulses *a*′′ and *c*′′ introduced are of opposite polarity and follow each other in relatively short time succession. However, since the inquiry element is remagnetized only once between the occurrence of the two distortion pulses, the energy transmitted to the read winding L is limited, resulting in very little distortion being introduced in the associated signal line. Further, because of the double distortion pulse character, the frequency signals that have the greatest effect on magnetic flux variations, comprise mostly harmonics of frequencies lying outside the speaking band of frequencies, and hence have substantially little effect especially when questioning telephone communication lines, for example.

The magnetic polarized conditions initially existing and described above serve merely to illustrate the invention. It is apparent that other magnetic polarized conditions my also exist, without departing from the teachings of the invention.

Figure 4A:
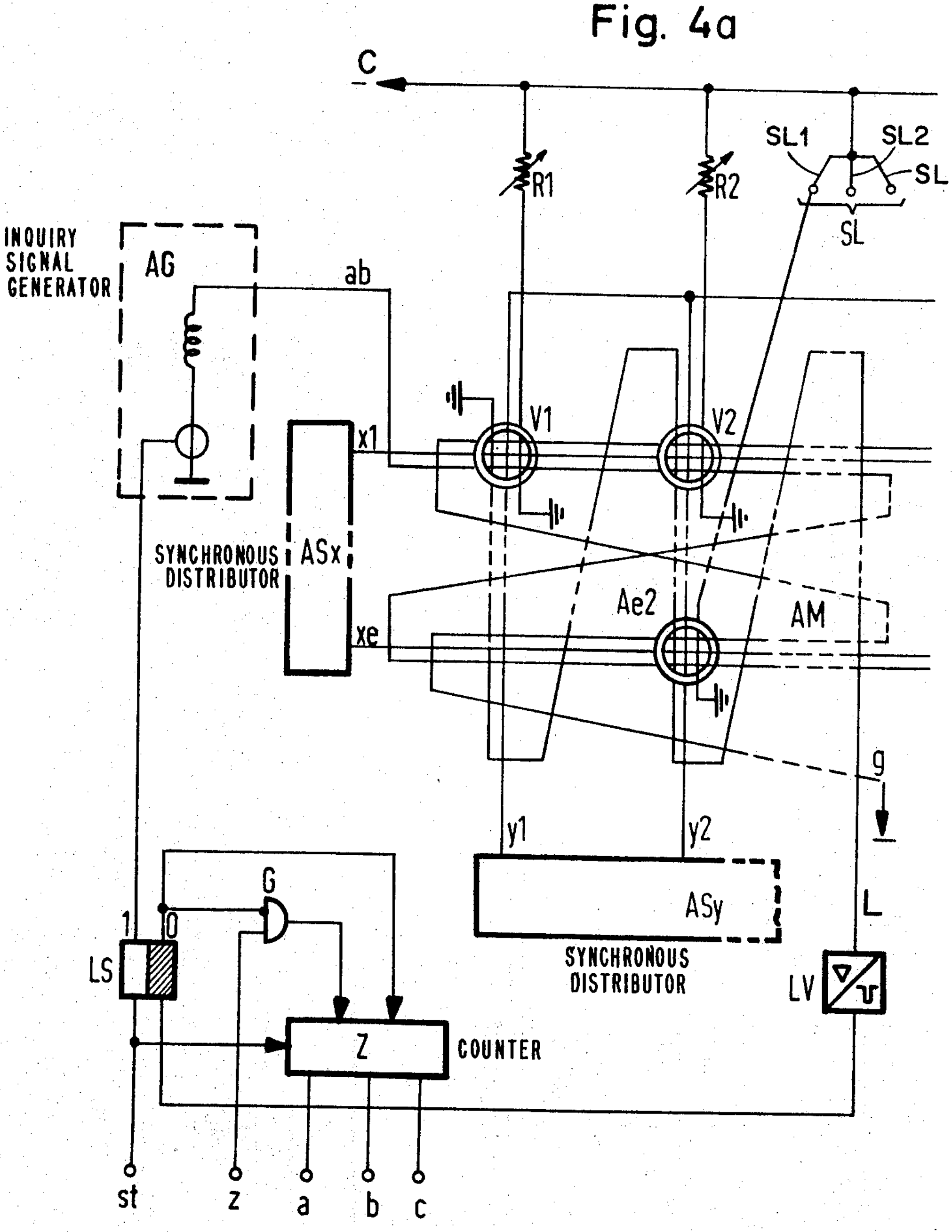
FIG. 4 comprises connected portions illustrated in FIGS. 4*a* and 4*b*, and is an electrical schematic diagram of the time evaluation means connected to the inquiry element matrix and supervisory control circuits, and the comparison means that effects operation of the selected inquiry element in the proper operation ranges, to provide correct indications of the state of the signal line being questioned.

FIG. 4 illustrates a further development of the invention, wherein comparison elements V1 and V2 are used in conjunction with their associated adjustment switching devices RG1 and RG2, respectively. Comparison elements V1 and V2 comprise ferromagnetic elements, such as magnetic cores, and are thus similar to the supervisory inquiry elements utilized. Further, they are connected in matrix AM of which only a portion is shown. However, the input windings of comparison elements V1 and V2 are not connected to associated signal lines; instead, the input windings thereof are controlled by signals transmitted over variable resistors R1 and R2, respectively, from the source of operational potentials C.

As shown in FIG. 4, signal line SL1 is connected to its associated supervisory inquiry element AE2. The source of operation signals C also feed input signals to signal lines SL1, SL2, and SL3.

The comparison elements V1 and V2 illustrated, are connected to associated adjustment switching devices RG1 and RG2, respectively. Comparison element V1 and its associated adjustment switching device RG1, functions to adjust the supplementary preenergization current fed to counter magnetization line G. Comparison element V2 and its associated adjustment switching device RG2, functions to adjust the amplitude of the inquiry signals. Comparison elements V1 and V2 are both checked once during each inquiry cycle. Depending upon the inquiry signals obtained from the comparison means V1 and V2, associated adjustment switching devices RG1 and RG2, are controlled to effect changes in the supplementary preenergization current transmitted by the counter magnetization line G, and the amplitude of the inquiry signals, respectively.

After the inquiry element of the signal line to be questioned is selected, by synchronous distributors ASX and ASY, multivibrator reading device LS is switched from the rest condition to the operating condition by a control pulse transmitted over connection line *st*. This activates the inquiry generator AG, and inquiry signals are transmitted over inquiry connection line *ab* to the selected inquiry element A*e*2. Simultaneously, gate G is opened effecting a through connection of the synchronizing pulses transmitted over connection line Z1 to counter Z, which fixes the time limits for the individual evaluation ranges corresponding to the inquiry signal segments. When reading amplifier LV is biased by the signals induced in the output winding of the selected inquiry element A*e*2 so as to produce a binary 1 output, reading device LS is again switched to the rest condition. Simultaneously, gate G is closed, and counter Z stops counting and produces an indication of the state of signal SL1 being supervised. Depending upon the number of pulses counted by counter Z, a supervisory indicating pulse equal to binary 1 is transmitted to the appropriate connection line *ar*, *b* or *c*, corresponding to the condition of the signal line. This is then evaluated by evaluator AW (not shown) to determine the state of signal line SL1.

Figure 4B:
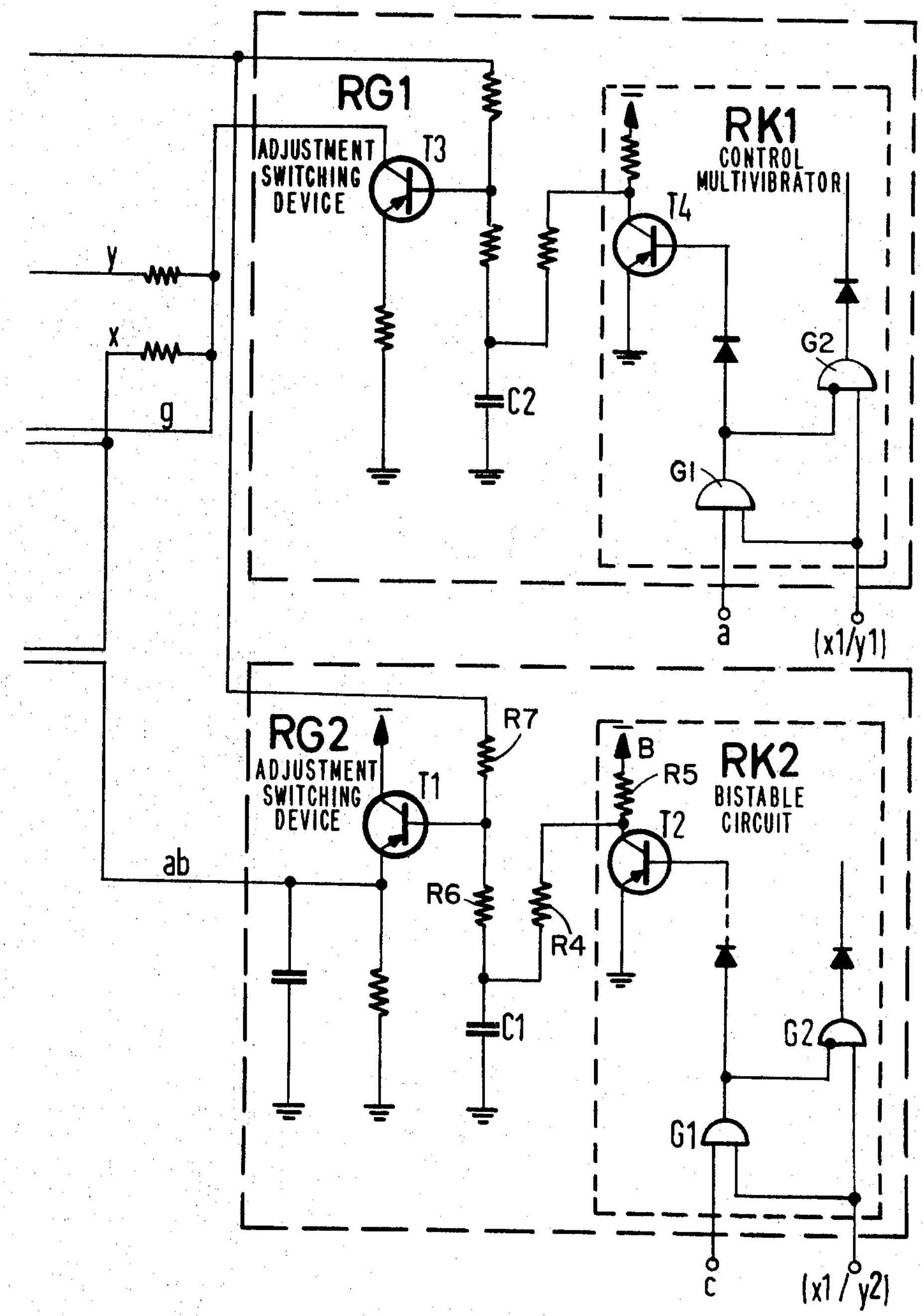

During each inquiry cycle of the selected inquiry element of the signal line being supervised, comparison elements V1 and V2 are also checked once, and depending upon the evaluation made therefrom, particular adjustments are made in switching devices RG1 and RG2. With reference to FIG. 4*b*, it is seen that adjustment switching devices RG1 and RG2 comprise control input lines ($x1/y1$) and *a*, and ($x1/y1$) and *c*, respectively. The input lines *a* and *c* of bistable multivibrator stages RK1 and RK2 may be respectively connected to connection lines *a* and *c* of counter Z. Control input lines ($x1/y1$) and ($x1/y2$) of the multivibrator stages RK1 and RK2 are respectively connected to the row and column connection lines designated, and are activated selectively by the synchronous distributors ASX and ASY to effect activation of their respective adjustment switching devices.

The bistable circuit RK2 includes a pair of associated transistors only one of which, transistor T2, is shown. The circuit is of a conventional construction and will readily be recognized to include a second transistor connected in substantially the identical manner as transistor T2. Each of the transistors of the bistable circuit RK2 may be of the PNP type as indicated. For such a transistor, a negative potential is maintained at the collector terminal, as indicated, the emitter terminal being connected to a relatively more positive potential, as indicated by the connection to ground. The base terminal of transistor T2 is connected through a diode to the output of gate G1. The base terminal of the second transistor is similarly connected through a diode to the output of gate G2.

First and second inputs comprising the control inputs C and ($x1/y2$) are applied to the bistable circuit RK2, and, more particularly, to the first and second inputs of gate G1. The control input ($x1/y2$) is also applied in common to a second input of gate G2 and the output of gate G1 is applied as a first input to the gate G2.

In accordance with standard logic terminology and well-known operation of logic gates such as G1 and G2, the bistable circuit RK2 is switched between a normal state in which the second transistor (not shown) controlled by the output of gate G2 is normally in its conducting state and the first transistor T2 is normally in a non-conducting state.

Gates G1 and G2 may comprise AND gates. In conventional operation, a binary 1 signal at each of the inputs of either gate G1 or gate G2 will result in the production of a negative potential or ground potential pulse at the respective outputs thereof. Conversely, the existence of a binary 0 signal at one or both of the inputs of gates G1 and G2 will render the latter disabled and produce a positive output potential at their respective output terminals.

When neither or only one of the control inputs C and ($x1/y2$) comprise a binary 1 signal, gate G1 will therefore be disabled and produce a positive output. When the control input ($x1/y2$) comprises a binary 1 signal, and the control input C comprises a binary 0 signal, a second positive potential signal is applied to gate G2, enabling the latter and producing a negative potential output. As a result the second transistor (not shown) is maintained conducting when one or both of the control inputs comprises a binary 0 signal.

Conversely, when each of the control inputs C and ($x1/y2$) comprise binary 1 signals, gate G1 is enabled and produces a negative potential output, thereby disabling gate G2. Gate G2 thereby produces a positive potential output, terminating conduction of the second transistor (not shown) of the bistable circuit RK2. The negative potential at the output of gate G1 enables conduction of transistor T2 whereby the collector terminal thereof is clamped to ground potential through the now conducting emitter-terminal path of transistor T2.

It is understood that the operating potentials described serve to illustrate the invention, and that equivalent circuits may be substituted therefor.

If, during a particular inquiry signal, a binary 1 output is produced at connection line C of counter Z, when comparison element V2 is being checked, transistor T2 will be activated, and capacitor C1 will thus be charged. Capacitor C1 is connected in the base circuit of transistor T1. Thus, as capacitor C1 is charged, the biasing potentials at the base of transistor T1 will negatively increase at a predetermined rate determined by the circuit component parameters. Under these conditions, the emitter of transistor T1 will become increasingly more negative, and the current flowing int he inquiry signal line *ab* will thereby increase.

When an output is not present at connection line C of counter Z, transistor T2 will not be activated and capacitor C1 will discharge through the parallel circuits comprising resistors R4 and R5 in series bucking connection to source B, and resistors R6 and R7 in series bucking connection to source C, respectively. Thus, the biasing potentials at the base of transistor T1, will become increasingly less negative. This will decrease the current flowing in transistor T1, and make the emitter increasingly more positive. Correspondingly, the current flowing in inquiry signal line *ab* will decrease. Adjustment switching device RG1, and its associated control multivibrator RK1, functions similarly, and thereby varies the supplementary preenergization current, flowing in counter connection line G to which the collector of transistor T3 is connected. The inputs to multivibrator RK1 comprise connection lines *a* and *x*1/*y*1 as illustrated with connection line *a* corresponding to connection line *a* of counter Z.

Figure 5:
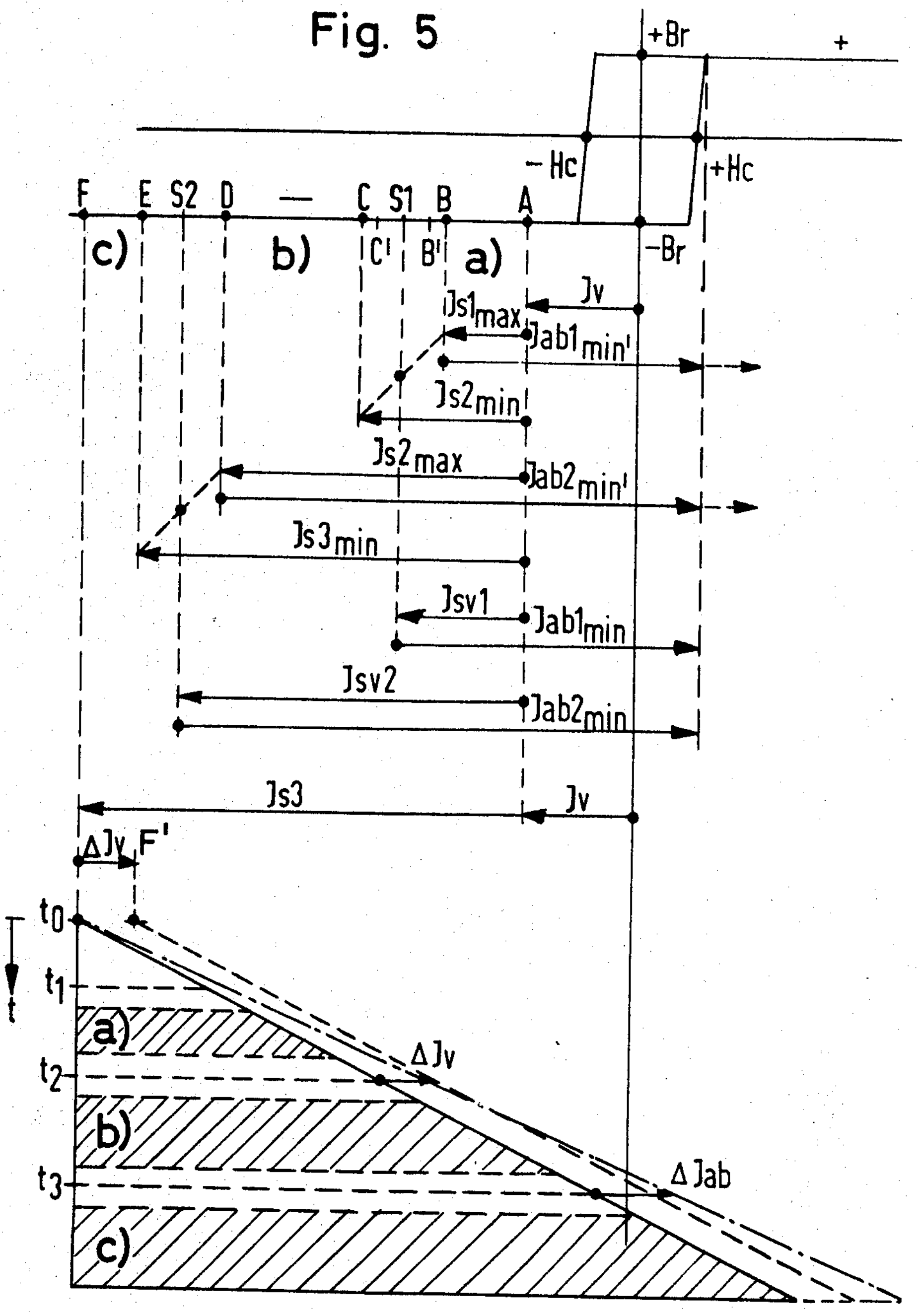
FIG. 5 shows an hysteresis loop similar to that illustrated in FIG. 3, and shows the various operation ranges of a typical magnetic inquiry element corresponding to the three possible signal line states of the signal line being supervised, and the effect of the supplementary preenergization current applied to the selected inquiry element.

FIG. 5 illustrates the hysteresis loop of a ferromagnetic inquiry element, which way comprise a ferrite core. Assuming that three possible conditions or ranges of signal amplitudes may be transmitted by the signal lines, corresponding minimum and maximum magnetization currents fixing the evaluation limits of the three states, *a*, *b*, and *c*, are illustrated. In the rest position of the ferromagnetic inquiry element, that is, in the absence of any magnetization current to the input winding thereof, the selected inquiry element is preenergized by supplementary preenergization current J*v*, to effect magnetization of the inquiry element to point A in the negative saturation range. As discussed heretofore, the address signals of the selected inquiry elements are transmitted by the associated row and column connection lines and counter magnetization line G, to the selected inquiry element in such a manner as to produce magnetic fields which cancel. Therefore, in the absence of the supplementary preenergization signal J*v*, the selected inquiry element would be in the negative remanent magnetic state, —B*r*, assuming, of course, that it had been magnetized to the negative saturation range prior to its selection.

In the absence of variable supplementary preenergization control currents J*v*, a number of factors can contribute to shifting or variable magnetic operating conditions. For example, ageing of the magnetic inquiry element, variations in the inquiry signals or the operation signals of the signal lines, and temperature fluctuations may cause such changes. If these variable conditions drive the inquiry element deep into a saturation state, it would be necessary to apply a greater amplitude inquiry signal to effect remagnetization to the other saturation state. For example, with reference to FIG. 5, assume that in state *a* of the signal line, wherein both switches S1 and S2 are open, the magnetic operation point may be between points A and B, corresponding to currents of zero and $Js1_{max}$. To effect remagnetization, therefore, to the positive saturation range illustrated, the inquiry signal must be at least equal to $Jab1_{min'}$. Otherwise, remagnetization across the transition zone *t*2, will not occur, and a distinct recognition of signal-less state *a* will not be produced.

State *b*, wherein switch 1 is closed, likewise can effect the range of operating points defined between point C and D. Then, the currents flowing in the signal line may be between minimum and maximum values of $Js2_{min}$ and $Js2_{max}$, respectively. It will thus be necessary that the inquiry signal be equal to at least $Jab2_{min'}$ to effect remagnetization. Similarly, with reference to signal condition *c*, wherein switch 2 is closed, the operating range may be below point E, which corresponds to a signal line current of $Js3_{min}$.

The adjustment means described function to compensate for variations and shifts in the magnetic states of operation of the supervisory inquiry elements corresponding to particular signal line conditions, which may cause inaccurate inquiry results. For example, if the supplementary preenergization current J*v* increases, inquiry signal segments $Jab1_{min'}$ or $Jab2_{min'}$ will not be sufficient to cause remagnetization of the inquiry element associated with the signal line being questioned. (It is assumed that an increase in preenergization current J*v* drives the magnetic inquiry element deeper into the negative saturation range.) It is therefore seen that the inquiry signal segments must necessarily be increased in amplitude to compensate for the increase in supplementary preenergization current J*v*. Simultaneously, however, the transition between the different possible conditions of the signal lines must be distinguishable to effect accurate evaluation thereof.

The comparison elements which comprise additional inquiry elements as heretofore explained, are therefore fed with predetermined control signals, that drive the comparison elements to predetermined magnetic states in the negative saturation range. If two comparison elements are utilized to define the boundaries between successive states *a* and *b*, for example, states B′ and C′, lying outside the operation range may be selected.

It is seen that operating point B′ and C′ lie between the maximum and minimum operating points corresponding to conditions *a* and *b*, respectively. Therefore, when the comparison elements corresponding to these operating points are energized, and assuming they ccmprise magnetic cores, it is seen that the upper limit of condition *a* and the lower limit of condition *b*, may be defined by states B′ and C′, which may be utilized to fix the limits between successive signal states *a* and *b*.

Further, the inquiry results obtained by checking the comparison elements may be utilized to control a bistable multivibrator similar to that discussed with reference to FIG. 4. In one switching state of the multivibrator, the supplementary preenergization current will be increased, and in the other switching state, the supplementary preenergization current will be decreased. For example, if in checking the comparison element fixed at operation point B′, a binary 0 inquiry result (representative of no change in magnetic state) is obtained, the supplementary preenergization current J*v* will be decreased. On the other hand, if in checking the comparison means fixed at point C′, a binary 1 inquiry result (representative of remagnetization of comparison element) is obtained, the supplementary preenergization current will be increased. Opposite changes in the supplementary preenergization current will be effected when binary 1 and binary 0 inquiry results are obtained when checking comparison elements V1 and V2, respectively. Therefore, the comparison elements and bistable multivibrator effect changes in the preenergization current that cause the comparison elements to lock into operating states B′ and C′ and thereby compensate and adjust for the various factors that may shift the operation ranges corresponding to the different signal line conditions and which may therefore cause false inquiry results. As explained, above, false inquiry results may be due to ageing of the magnetic inquiry element, fluctuations in the temperature and operation potentials of the inquiry elements, and other such factors.

Alternatively, to using two comparison elements to define transitions between successive signal line conditions, the same adjustment may be effected by using only one comparison element having an operating point between the ranges associated with successive signal line conditions. Preferably, the operation points of the comparison elements are selected substantially midway between the recognition limits of two successive signal line states.

For example, with reference to FIG. 5, the first and second comparison elements may be energized by the inquiry signals, to drive the comparison elements to magnetic conditions represented by points S1 and S2, which are midway between the ranges between states B and C and D and E, respectively. It is seen that a current equal to $Jsv1$ and to $Jsv2$ must be applied to the first and second comparison elements to drive them to the desired operation points S1 and S2, respectively. Then, under normal conditions, input signals to the first and second comparison elements equal to at least $Jab1_{min}$, and $Jab2_{min}$, must be applied to effect remagnetization of the associated comparison element to the positive saturation range. Thus, when the comparison elements corresponding to states S1 and S2 are remagnetized, this will indicate that the limit between successive signal line conditions *a* and *b*, and *b* and *c*, respectively, has been exceeded.

Therefore, operating states S1 and S2 may be used to fix the lower negative saturation limits of states *b* and *c*. For example, if the inquiry signal current equals $Jab1_{min}$ (corresponding to S1) signal line condition *a* is recognized with certainty, since this current is greater than $Jab1_{min'}$ which corresponds to operating state B1. The same reasoning applies to operating state S2 and its corresponding current $Jab2_{min}$, and inquiry signal current $Jab2_{min'}$ corresponding to state D.

For example, in FIG. 5 and with reference to FIG. 4, assume that the supervisory inquiry element associated with the signal line in question, is provided with a current at its input winding equal to $Js3$, and is therefore driven to operating state F in the negative saturation range. The inquiry signal illustrated, comprises a sawtooth wave which increases in magnitude with time and an associated time analysis means. Operating state F is indicative of the third possible condition of the signal line associated with the inquiry element, in which switch S2 is closed, and as heretofore explained. During each inquiry cycle of inquiry matrix AM, comparison elements V1 and V2 are also checked once, at times $t_1$ and $t_2$, respectively, to produce checking inquiry results to effect compensatory changes in the preenergization current $Jv$ and inquiry signal current $i_{ab}$, respectively, if the operating points corresponding to the three possible signal line conditions of the supervisory element have shifted. Assume that at time $t_0$, the sawtooth inquiry signal is applied to the supervised inquiry element, and that zones *a*, *b*, and *c*, represent the individual segments corresponding to the recognition ranges of signal line conditions *a*, *b*, and *c*, respectively. It is seen that in the example shown, the signal line being questioned is in condition C.

At times $t_2$ and $t_3$, the first and second comparison elements are respectively checked. If at time $t_2$, the first comparison element produces a binary 0 output at its output winding, when a current equal to $Jab1_{min}$ is applied to its control winding, and which should effect remagnetization of the first comparison element, this will be indicative of the fact that the supplementary preenergization current $Jv$ is too great in amplitude. Accordingly, it should be decreased. It is seen, that if the supplementary preenergization current $Jv$ is decreased, this will effectively displace operating point F to the right of the negative range of the magnetization curve, that is, it will become less negatively saturated and will in effect shift to point F′. The supplementary preenergization current $Jv$ is increased during successive inquiry cycles until repeated checking of the first comparison element at $t_2$, produces a binary 1 output at the output winding thereof. This is indicative of the fact that remagnetization of the first comparison element has occurred at time $t_2$. When this occurs, the supplementary preenergization current $Jv$ is again increased in amplitude until a binary 0 is produced at its output winding, upon further checking.

Thus, the supplementary preenergization current $Jv$ swings between certain amplitude limits, $\Delta Jv$, until it locks into the amplitude value which corresponds to the predetermined evaluation conditions. It is seen that the inquiry signal is thus effectively shifted between certain values or operating points, as a result of variations in the preenergization current. This is indicated by the line in FIG. 5, designated $\Delta Jv$. With reference to FIG. 4, connection line *a* is shown as providing an indication of the state of comparison element V1 at time $t_2$, assuming a sawtooth inquiry signal is generated by generator AG to effect desired changes in the supplementary preenergization current $Jv$.

The first comparison element thus effects a shift of the sawtooth wave between operating points. However, at time $t_3$, the second comparison element may effect changes in the slope of the sawtooth wave. This, of course, is accomplished by constantly changing the amplitude of the sawtooth wave inquiry signal applied to the supervisory inquiry element, as illustrated by the "line-dot-line" curve of FIG. 5. With reference to FIG. 4, connection line C is used to transmit the inquiry results obtained by checking comparison element V2 and time $t_3$ to effect a change in the slope of the inquiry signal *ab*. It is understood that each change in the supplementary preenergization current Jv effected at time $t_2$, also influences the inquiry result obtained by checking the second comparison element supervising the amplitude or slope of the sawtooth inquiry signal at time $t_3$. For example, if an amplitude change in the sawtooth inquiry signal equal to $\Delta Jab$ is produced at time $t_3$, the inquiry result obtained in checking the first comparison element at time $t_2$ will be effected. Thus, there is mutual interaction between changes effected at times $t_2$ and $t_3$. The comparison elements are checked and produce changes in the supplementary preenergization current and inquiry signal current until the adjustment system element has swung itself to effect substantially optimum operating states which best correspond to the predetermined evaluation conditions corresponding to the operation points illustrated in FIG. 5.

Figure 6:
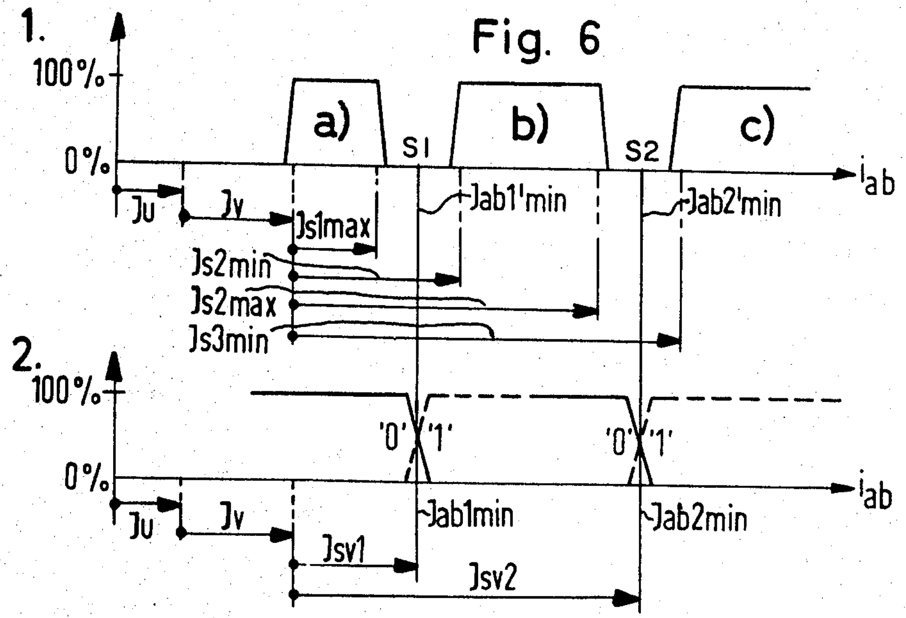
FIG. 6 comprises graphs 1 and 2, illustrating the inquiry results that may be obtained in response to the inquiry elements and the comparison means.

FIG. 6, graph 1, illustrates the unique characteristics of the three inquiry results that may be obtained from the supervised inquiry element depending upon the state of the associated signal line. FIG. 6, Example 2, illustrates the successive inquiry signal results obtained from the comparison means. The current designations shown in FIG. 6, correspond to those shown in FIG. 5. It is evident from both graphs 1 and 2, that the transition between signal line states comprises a region wherein the recognition possibility of a certain predetermined signal line state either increases from 0% to 100%, or decreases from 100% to 0%. This is similarly true for the comparator elements wherein the solid lines of the graph correspond to a checking inquiry result of binary 0, and the broken line portions of the graph correspond to a checking inquiry result of binary 1.

It is seen that where the curves of the operation characteristics of the two comparison elements intersect, there exists equal probabilities that the comparison element will or will not be remagnetized. If, therefore, the inquiry result from the comparison element equal to binary 0 is used to effect a decrease in the supplementary preenergization current $Jv$, and an inquiry result from the comparison element equal to binary 1 (representative of remagnetization of the comparison element), is used to effect an increase in the supplementary preenergization current $Jv$, predetermined comparison points S1 and S2 can be accurately maintained, providing substantially constant correct evaluation conditions for the supervisory inquiry elements.

Alternatively, to varying the supplementary preenergization current $Jv$, the inquiry signal line current may also be varied to effect the desired adjustments. Or, both the supplementary preenergization magnetization current $Jv$, and the inquiry signal current $i_{ab}$ may both be varied. When a stepped wave or a sawtooth wave inquiry signal is utilized, an additional adjustment of the amplitude conditions of successive evaluation stages corresponding to successive inquiry signal segments may also be varied. For example, when a stepped wave signal is utilized, the ratio of the amplitudes between successive segments may be varied, and when a sawtooth wave signal is utilized, the slope thereof may be varied, as described heretofore.

Comparators V1, V2, and V3, are not selectively connected at different time intervals, but are simultaneously activated during each inquiry cycle. Therefore, the control windings connected to the address signals X and Y of comparators V1, V2, and V3, are not connected to different row and column connection lines of matrix AM, but instead are connected in series to the parallel connected circuits comprising the row and column connection lines. As heretofore discussed, counter magnetization line G is connected in series to address connection lines X and Y. Further, supplementary preenergization current generator $G_{jv}$ is connected to counter magnetization line G to provide predetermined supplementary preenergization current $J_V$.

The utilization of the circuit illustrated in FIG. 7, eliminates the necessity for using the adjustment switching devices illustrated and explained with reference to FIG. 4. Thus, the time analysis means illustrated in FIG. 7, and particularly, the generation of indicating signals corresponding to times $t_1$, $t_2$, and $t_3$, automatically adjusts to changes in the individual operation conditions corresponding to the three possible signal line conditions *a*, *b*, and *c*. For example, changes in the inquiry signal generated by generator AG, in the operating potentials of address signals X and Y, and in temperature fluctuations that may affect the inquiry elements, are also operative on comparators V1, V2, and V3, providing a tracking relationship therebetween to produce automatic adjustment of the time analysis means illustrated in FIG. 7 to conform to the individual existing operating conditions. Thus, the same effective results are obtained, as are obtained in the FIG. 4 embodiment of the invention, which provides for adjustment of the supplementary preenergization current, and the slope of the sawtooth inquiry signal. Further, the preenergization current is variable by adjusting the base bias, or the potential at the collector of transistor T.

It is understood that the inquiry signals illustrated in the various embodiments of the invention, have been described to illustrate the invention. Other inquiry signals may be substituted without departing from the teachings of the invention. Further, to better explain the invention, particular polarization states have been assumed, to explain the operation of various embodiments of the invention. It is apparent that other polarization states may also be used.

Figure 7:
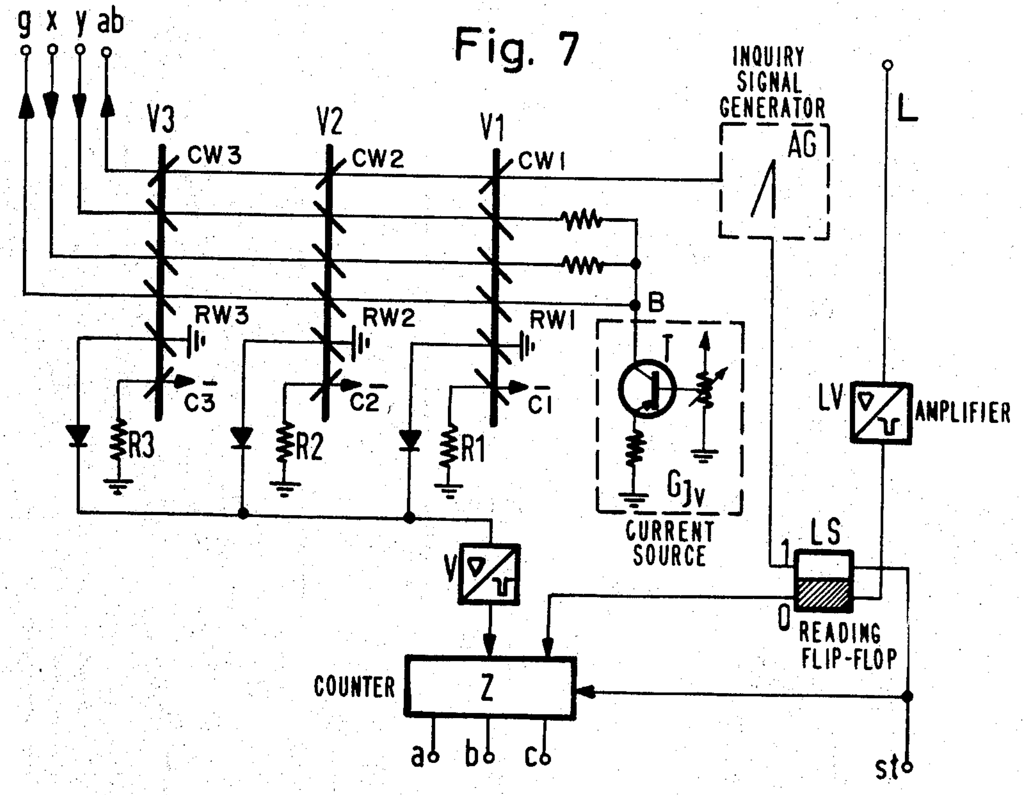
FIG. 7 is an electrical schematic diagram of a sawtooth wave generator, and a time evaluation means which may be utilized to determine the time at which a predetermined magnetization change occurs in the inquiry element associated with the signal ine being questioned, and associated apparatus to effect automatic compensation for error-producing factors.

FIG. 7 illustrates a preferred embodiment of the invention which provides counter synchronizing pulses to counter Z, when a sawtooth wave is utilized as the inquiry signal. Comparators comprising three additional inquiry elements, V1, V2, and V3, similar to the inquiry elements being questioned, are utilized. The control windings, CW, CW2, and CW3 of the three inquiry elements, are connected in the connection line *ab*, and are thus fed by the sawtooth wave generated by generator AG. The three comparators V1, V2, and V3, are respectively fed over resistors R1, R2, and R3, by currents which initially magnetize the comparators to the magnetic threshhold values of the supervisory recognition limits corresponding to the three possible signaling states of the signal lines, thereby fixing evaluation stages *a*, *b*, and *c* (see FIG. 5).

Comparators V1, V2 and V3, respectively fix times $t_1$, $t_2$, and $t_3$, between which remagnetization of the respective comparator element may occur, to induce a relatively large amplitude current in the associated read winding. This in turn is amplified by amplifier LV, which then feeds a binary 1 pulse to counter Z, to effect a one integer count.

It is, therefore, seen that the comparator elements V1, V2, V3, will successively produce output pulses in read windings RW1, RW2, RW3, as the sawtooth wave applied to control windings CW1, CW2, CW3, respectively, progresses between its minimum and maximum amplitude values. Thus, counter Z will count progressively from 1 to 3 as the sawtooth inquiry signal reaches the three threshhold values, $t_1$, $t_2$, and $t_3$, respectively. Termination of the counting process will occur when reading flip-flop LS deactivates sawtooth generator AG and counter Z when remagnetization of the supervised inquiry element of the signal line being questioned occurs. This occurs when a binary 1 pulse is induced in read winding L, and is fed to reading flip-flop LS. Then, the number of pulses that have been counted by counter Z will be evaluated by evaluator AW (not shown) connected to connection lines *a*, *b*, and *c*, to determine the state of the inquiry element associated with the signal line being questioned.

Preferably, the magnetic threshold preenergization signals C1, C2, C3, respectively applied to R1, R2, R3 are provided by a common source of operational signals, which are also applied to the signal lines. This offers the advantage that fluctuations in the operational potential of the signal lines are tracked by corresponding fluctuations in the threshold preenergization signals applied to the comparators. Therefore an incorrect evaluation of the particular state of the signal lines being questioned, will not occur.

We claim:

1. A system for supervising a plurality of signal lines having different conditions corresponding to different signal amplitudes which comprises:

a matrix (AM) comprising a plurality of inquiry elements, each inquiry element (A*e*0; A*e*2) having input means, and further having at least one predetermined energy saturated operating state and at least one possible predetermined energy unsaturated operating state, depending upon the signal supplied thereto, and being connected to an associated signal line to effect an initial operating state in response to the signal amplitude condition thereof, a source (AG) of inquiry signals, selection means (ASX, ASY) operatively connected to the matrix (AM), to select an inquiry element, means to then apply the source of inquiry signals to the input means of the selected inquiry element to effect a change in operating state from the initial predetermined operating state of the selected inquiry element in response to the inquiry signal, evaluation means (AW) connected to the inquiry elements to evaluate the change in operating state effected in the selected inquiry element to provide an indication of the signal condition of the associated signal line (S*eo*, SL1), first biasing means (*x*, *y*, *g*) connected to the inquiry elements to energize and bias the selected inquiry element to a predetermined energy reference value, and the remaining inquiry elements to an energy value in at least one energy saturated operating state so that changes from the initial operating states are not effected in the remaining inquiry elements by the inquiry signals.

2. A system for supervising a plurality of signal lines as recited in claim 1 further comprising:

compensation means (RG1, RG2, $G_{jv}$) connected to the inquiry elements, to compensate for variations from the initial predetermined operating states thereof.

3. A system for supervising a plurality of signal lines as recited in claim 1 wherein the selection means (ASX, ASY) comprises a source of address signals (XY) selectively connected to the plurality of row and column connection lines (X*e*, Y*o*) to effect selection of the inquiry element (A*eo*) to be supervised, and wherein the first biasing means comprises a counter connection line (*g*) connected to the selected inquiry element and its associated row and column connection lines ($Xe$, $Yo$), to feed the address signals to the selected inquiry element in opposite polarity relative to the signal polarities on row and column connection lines.

4. A system for supervising a plurality of signal lines as recited in claim 2, wherein the compensation means comprises a source (RG2) of variable supplementary signals ($Jv$) connected to a counter magnetization line, to feed the supplementary signals additively to the address signals flowing therein.

5. A system for supervising a plurality of signal lines as recited in claim 4 wherein the compensation means further comprise adjustment means (RG2) connected to the source of inquiry signals (AG) to vary the amplitude of the inquiry signals depending upon the variations from the initial predetermined operating states.

6. A system for supervising a plurality of signal lines as recited in claim 1 wherein the compensation means comprise second biasing means (RG1, RG2, $G_{jv}$) to supplementally and variably energize and bias the plurality of inquiry elements, depending upon the variations from the initial predetermined operating states.

7. A system for supervising a plurality of signal lines as recited in claim 6 wherein the source of inquiry signals (AG) generates a sawtooth inquiry signal which successively increases in amplitude.

8. A system for supervising a plurality of signal lines as recited in claim 7 which further comprises:

counter means (Z) connected to the selected inquiry element and the source of inquiry signals (AG) to determine the time at which a change in operating state from the initial operating state occurs in response to the inquiry signal, and to produce a time indication signal (L) indicative thereof, connection means ($aw$) connected to the time analysis means (Z) to feed the time indication signal to the evaluation means (AW), the evaluation means evaluating the time indication signal to provide an indication of the signal condition of the associated signal line.

9. A system for supervising a plurality of signal lines as recited in claim 7 wherein the time analysis means further comprises comparator means (V1, V2, V3) connected to the source of the inquiry signals, a source of comparator signals (C1, C2, C3) connected to the comparator means to feed comparison signals thereto corresponding to said possible different signal amplitude conditions of the signal lines, the comparator means having reading means (RW1, RW2, RW3) which provide read signals when the inquiry signals are equal to a comparison signal, counter means (Z) connected to the comparator means to count the read signals, switch means (LS) connected to the counter means (Z) and to the selected inquiry element to deactivate the counter means (Z) and the source of inquiry signals when a change between energy saturated operating states occurs.

10. A system for supervising a plurality of signal lines as recited in claim 9 wherein the comparator means comprises at least three additional elements (V1, V2, V3) for performing the inquiry function connected to the source of inquiry signals (AG).

11. A system for supervising a plurality of signal lines as recited in claim 10 further comprising a common source of operating signals connected to the signal lines to provide the different signal amplitudes, and to corresponding inquiry elements of the comparator means to provide the comparator signals (C1, C2, C3).

12. A system for supervising a plurality of signal lines as recited in claim 1 wherein the source of inquiry signals generates a stepped wave ($a'$, $b'$, $c'$) comprising at least three successively increasing amplitude levels, and wherein the compensation means comprises amplitude adjustment means (RG2) to vary the ratio of the amplitude levels according to the variations from the initial predetermined operating state.

13. A system for supervising a plurality of signal lines as recited in claim 1 wherein the plurality of inquiry elements comprise ferromagnetic inquiry elements.

14. A system for supervising a plurality of signal lines as recited in claim 1 wherein the plurality of inquiry elements comprise ferroelectric inquiry elements.

15. A system for supervising a plurality of signal lines as recited in claim 2 further comprising:

comparison means (V1, V2) connected to the selection means (ASX, ASY) and actuable thereby to produce comparison signals indicative of variations from the initial predetermined operating states, the compensation means (RG1, RG2) being connected to the comparison means and being responsive to the comparison signals to compensate the inquiry elements for variations from the initial predetermined operating states.

16. A system for supervising a plurality of signal lines as recited in claim 15 wherein the comparison means (V1, V2) comprise at least two additional elements for performing the inquiry function.

References Cited

UNITED STATES PATENTS 3,238,306 3/1966 Bohlmeiter.
3,415,955 12/1968 Singer.

KATHLEEN H. CLAFFY, Primary Examiner

W. A. HELVESTINE, Assistant Examiner